UNITED STATES PATENT OFFICE.

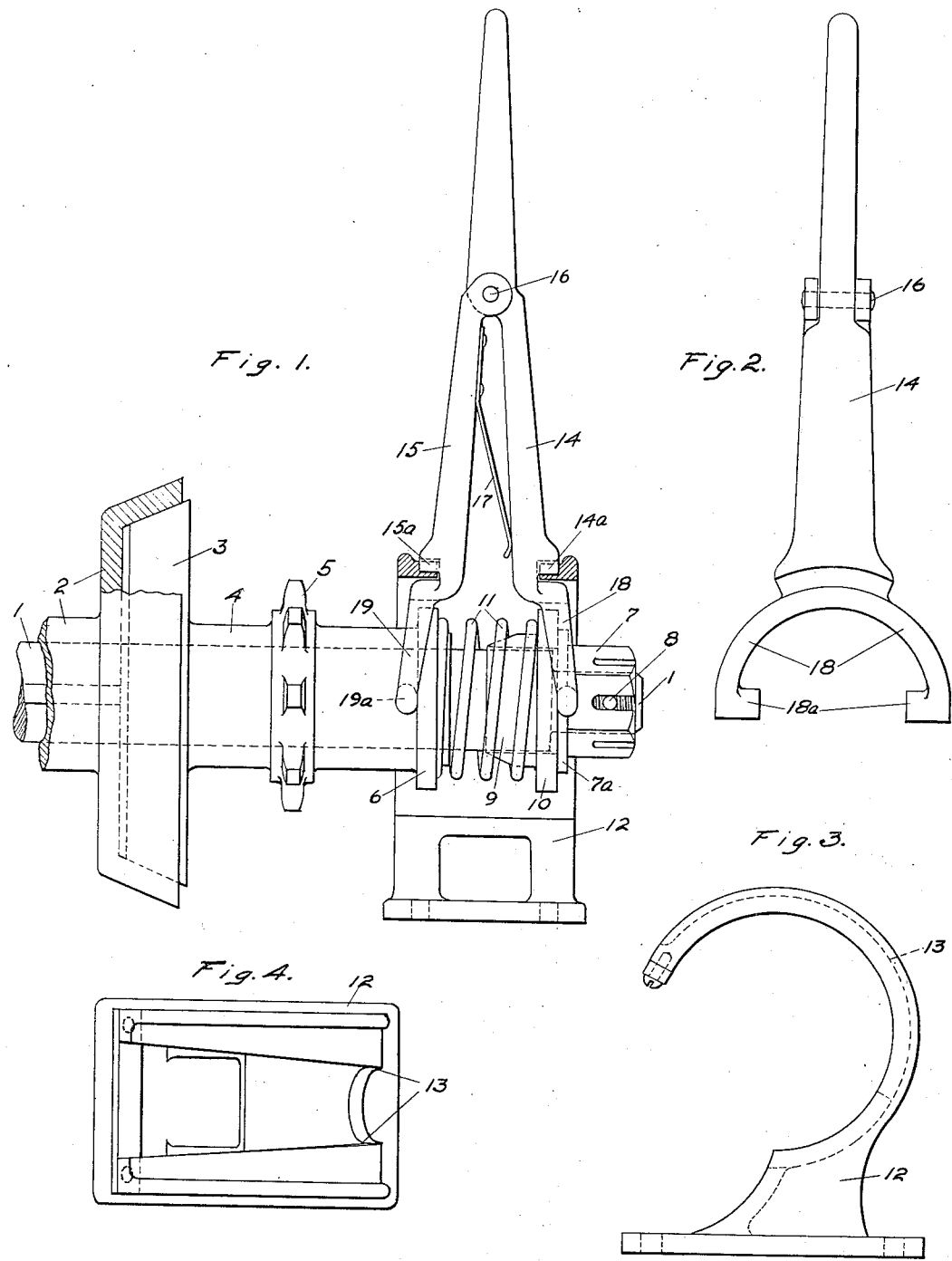
A. L. BRATTON.
CLUTCH MECHANISM.
APPLICATION FILED OCT. 27, 1915.
1,258,310. Patented Mar. 5, 1918.

ALBERT L. BRATTON, OF PORTLAND, OREGON.

CLUTCH MECHANISM.

1,258,310.　　　　　Specification of Letters Patent.　　Patented Mar. 5, 1918.

Application filed October 27, 1915.　Serial No. 58,216.

*To all whom it may concern:*

Be it known that I, ALBERT L. BRATTON, a citizen of the United States, residing in the city of Portland, county of Multnomah, and State of Oregon, have invented certain new and useful Improvements in Clutch Mechanisms, of which the following is a specification.

My invention relates to clutch mechanisms, and more particularly to certain improved mechanisms by means of which one clutch member can be moved into and out of driving connection with another clutch member.

Among the salient objects of my invention are: to provide a simple, practical and highly efficient mechanism of the character referred to, which can be manufactured at comparatively low cost, and which is automatically held in its different positions of adjustment; to provide in a device of the character referred to, spring-actuated means operating to normally and yieldingly hold said clutch members in operating engagement with each other, with simple mechanism for compressing the spring of said mechanism and for moving one of said clutch members away from and out of driving engagement with the other.

In order that others may clearly understand my invention I have illustrated one practical embodiment thereof in the accompanying sheet of drawings which I will now describe.

Figure 1 is a side elevation thereof with parts broken away and in section to more clearly show the construction thereof;

Fig. 2 is a flat view of an operating member;

Fig. 3 is a side elevation of a bracket bearing member within which the operating member shown in Fig. 2 is moved; and Fig. 4 is a top plan view thereof.

Referring now to the drawings, 1 designates the engine shaft having mounted thereon and turning therewith, a friction clutch member 2. Slidably mounted upon said shaft 1, is an inner clutch member 3, provided with a sleeve 4, with a sprocket wheel 5, and with a bearing flange 6. Mounted upon the end of the shaft 1, is a castle nut 7, adapted to be adjusted to different positions on said shaft and there locked by means of a cotter pin 8. The threaded end portion of said shaft 1, is slightly reduced in size from the main portion thereof. Slidably mounted upon the main portion of said shaft and adapted to bear against said nut 7, is a bearing sleeve member 9, having an annular flange, or collar, 10, adapted to be engaged by a washer 7ª, on said shaft 1.

Mounted upon said shaft between the bearing flange 6, on the sleeve 4, and the flange 10, on the bearing sleeve member 9, is a coiled spring 11, normally operating to force the sleeve 4, and the inner clutch member 3, toward and into driving connection with the clutch member 2.

A bracket bearing member 12, shown in Fig. 3, in side view, is mounted so as to partially encompass said shaft 1, said operating spring 11, and the flange members 6 and 10, against which the opposite ends of said spring 11 bear, as is clearly illustrated in Fig. 1. Said bracket bearing member 12, is provided with a tapered bearing slot 13, extending from its upper end circumferentially toward its base portion, said slot being widest at the upper or free end of said member, as clearly indicated in Fig. 4, and tapering to a reduced size toward its base.

Mounted in said bracket bearing member is an operating member comprising two prongs 14 and 15, hinged together, as at 16, and normally moved apart by means of a spring 17 therebetween, said prong members 14 and 15, being provided at their lower ends with bearing yokes, as 18 and 19, respectively. The yoke 18, on the prong 14, is provided with bearing lugs 18ª, which bear against the outside of the flange 10, on the bearing sleeve member 9, and the yoke 19 on the member 15, is provided with similar bearing lugs 19ª, which bear against the outer sides of the flange piece on the sleeve 4. Said prong members 14 and 15, are mounted to move in the tapering slot in the bracket bearing member 12, and are provided with guide bearing notches, as 14ª and 15ª, which move upon the inner edges of the curved portion of the bracket bearing member 12, as will be clearly understood from the Fig. 1. Thus it will be understood that as said operating member is moved in one direction, or toward the wide portion of the slot 13, it will permit the spring 11, to force the sleeve 4, and the inner clutch member 3, into driving engagement with the clutch member 2, and when said operating member is moved in the opposite direction, or toward the reduced end of said slot 13, the prong members 14 and 15, will be forced together by the sides of said bracket bearing member, and will, therefore, operate to compress the spring 11, by moving the flange 6, toward the flange 10, and thereby also drawing the sleeve 4, and the inner clutch member 3, out of driving engagement with the other clutch member 2.

It will be noted that the operation of the prong members 14 and 15, between the opposite sides of the bearing member 12, is positive, and transversely of the movement of the sleeve 4, upon the shaft 1, and that it will, therefore, remain in any position at which it is stopped, by reason of the engagement of the notches 14$^a$ and 15$^a$, with the inner edges of the member 12.

The simplicity of the invention is apparent from the drawings, as is also its practicability. Its operation is also very simple.

I am aware that changes can be made in the details of construction here shown for purposes of illustration without departing from the spirit thereof, and I do not, therefore, limit the invention to the particular embodiment thereof, here shown, except as I may be limited by the hereto appended claims.

I claim:

1. A clutch mechanism of the character referred to comprising in combination with a shaft, a clutch member mounted on said shaft to turn therewith, a movable clutch member provided with a sleeve, slidably mounted on said shaft and adapted to be moved into and out of driving connection with said first mentioned clutch member, a fixed bracket member mounted adjacent said shaft and said sleeve, said bracket member having two converging guideways, an operating member movably mounted in said bracket and adapted to said guideways, and operating connections from said operating member to said sleeve, whereby movement of said operating member on said guideways operates to move said movable clutch member relative to said first mentioned clutch member.

2. In combination with a shaft, a clutch element secured thereto to turn therewith, a clutch element mounted on said shaft and movable thereon into and out of driving engagement with said first mentioned clutch element, a bearing element mounted on said shaft, a spring on said shaft between said bearing element and said movable element, and operating means for said movable clutch element comprising a two-part lever the parts of which are pivotally connected together with their ends operatively connected, respectively, with said bearing element and said movable clutch element, and fixed spaced members mounted adjacent said two-part lever and adapted to cause a movement of the parts thereof relative to each other when said lever is moved relative to and in engagement with said fixed spaced members, substantially as described.

3. In combination with a shaft, a clutch element secured thereto to turn therewith, a clutch element mounted on said shaft and movable thereon into and out of driving engagement with said first mentioned clutch element, a bearing element mounted on said shaft, a spring on said shaft between said bearing element and said movable element, and operating means for said movable clutch element comprising a two-part lever the parts of which are pivotally connected together with their ends operatively connected, respectively, with said bearing element and said movable clutch element, and fixed converging guide members between which said two-part lever is movable to operate the parts thereof toward each other, substantially as described.

4. In combination with a shaft and clutch mechanism mounted thereon, a fixed bracket bearing member mounted adjacent thereto and disconnected therefrom, said fixed bracket bearing member having two tapering, or converging, guideways, a two-part operating member movably mounted in said bracket and adapted to said guideways, whereby the parts thereof are moved toward and from each other as said operating member is moved in said bracket member, and operating connections from said operating member to said clutch mechanism, whereby to operate the latter as said operating member is moved in said bracket member.

5. In a clutch mechanism of the character described, in combination with a shaft, a clutch member secured to said shaft to turn therewith, a movable clutch member provided with a sleeve and slidably mounted on said shaft into and out of driving connection with said first mentioned clutch member, a coiled spring on said shaft operating to normally hold said movable clutch member in driving connection with said first mentioned clutch member, a fixed bracket member mounted adjacent said shaft and said movable clutch member and provided with two tapering, or converging, guideways extending circumferentially around said shaft at a space therefrom, and a two part operating member mounted in said bracket and adapted to said guideways, said operating member having connections with said clutch member, whereby its movement in opposite directions in said bracket operates to move said movable clutch member relative to said first mentioned clutch member.

6. In a clutch mechanism of the character described, in combination with a shaft, a clutch member secured to said shaft to turn therewith, a movable clutch member provided with a sleeve and slidably mounted on said shaft into and out of driving connection with said first mentioned clutch member, a coiled spring on said shaft operating to normally hold said movable clutch member in driving connection with said first mentioned clutch member, a fixed bracket member mounted adjacent said shaft and said movable clutch member and provided with a tapering slot whose sides converge, a two part operating member mounted in said slot and adapted to the opposite sides of the bracket member, said operating member having connection with said movable clutch member and said coiled spring, whereby movement of said operating member in opposite directions in said tapering slot, operates to compress said spring and move said movable clutch member away from said first mentioned clutch member.

7. In combination with a shaft and a clutch member movably mounted thereon, a coiled spring mounted on said shaft and normally moving said clutch member in one direction, a fixed bracket member mounted adjacent said shaft and said clutch member and partially surrounding the same at a space therefrom, said bracket member being provided with a circumferentially extending tapering slot, or guideway, a two part operating member movably mounted in said slot, or guideway, and adapted to be moved therein, whereby said parts are moved toward and from each other as said operating member is moved in said bracket, and operating connections from said operating member for moving said clutch member in opposition to said spring, substantially as described.

8. In combination with a shaft and a movable clutch member mounted thereon, a bracket member fixedly mounted adjacent said shaft and around the same at a space therefrom, said bracket having a circumferentially extending tapering slot, a two-prong operating member mounted in said slot and adapted to be moved therein, whereby to move said prongs toward each other as said operating member is moved circumferentially of said slot, and operating connections from said prongs for moving said clutch member.

9. A clutch mechanism of the character described, comprising in combination with a shaft having a clutch member secured thereto and turning therewith, a movable clutch member provided with a sleeve and slidably mounted on said shaft into and out of driving connections with said first mentioned clutch member, a coiled spring on said shaft bearing against said sleeve, means secured to said shaft for regulating the tension of said spring, a bracket bearing member mounted adjacent said shaft and around the same at a space therefrom and provided with a tapering slot, or guideway, therein extending circumferentially thereof, and around said shaft, a two pronged operating member mounted in said slot and adapted to the opposite sides of said bracket member, and operating connections between the ends of said prongs and said clutch mechanism, whereby movement of said operating member in said slot, or guideway, operates to move said prongs toward and from each other and to operate said clutch mechanism, substantially as described.

Signed at Portland, Multnomah county, Oregon, this 21st day of October, 1915.

ALBERT L. BRATTON.

In presence of—
I. M. GRIFFIN,
C. C. MICHENER.